June 12, 1945.   H. G. WHITMORE   2,377,987
COMBINATION RANGE OR DISTANCE FINDER AND TRY-SQUARE
Filed Feb. 17, 1943
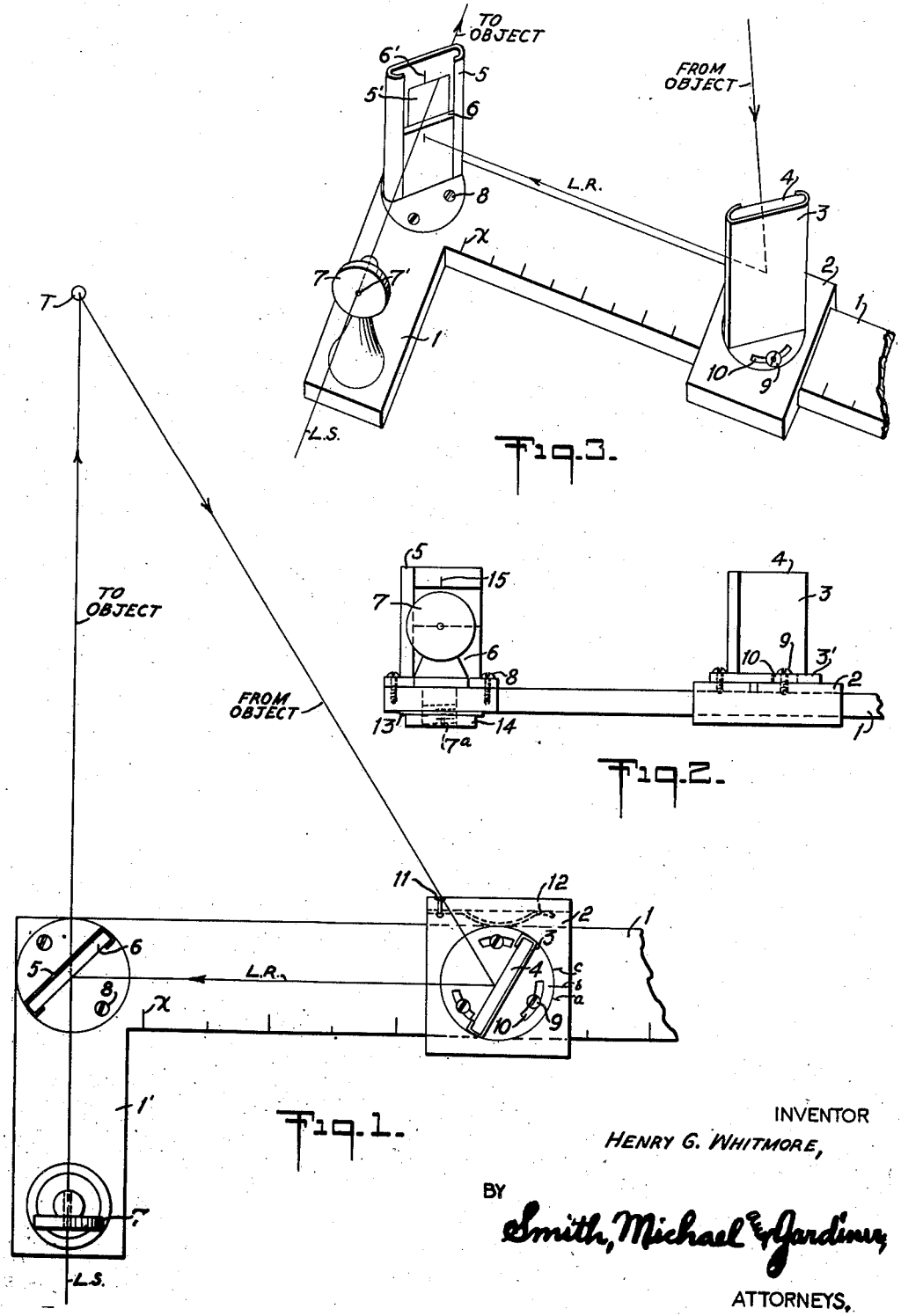
INVENTOR
HENRY G. WHITMORE,
BY
Smith, Michael & Jardine,
ATTORNEYS.

Patented June 12, 1945

2,377,987

UNITED STATES PATENT OFFICE 2,377,987

COMBINATION RANGE OR DISTANCE FINDER AND TRY SQUARE

Henry G. Whitmore, Newburyport, Mass., assignor to Samuel C. Brody, Newton, Mass.

Application February 17, 1943, Serial No. 476,168

2 Claims. (Cl. 88—2.4)

This invention relates to distance measuring devices, and, while capable of many uses is particularly useful as a range or distance finder.

The broad object of my invention is to provide a very light weight, compact and inexpensive device by means of which distances may be quickly and accurately established with the minimum of calculation by the user.

My distance finder is characterized by its simplicity of construction and operation. Unlike known devices for this purpose, it dispenses with any elaborate system of optics or movable parts, and hence may be operated by even the most unskilled user, or under the most adverse weather conditions. Yet, because of the geometrical principle on which it operates, it is unusually accurate at all ranges of visibility and under all conditions of service.

Other objects and advantages will appear as the description proceeds.

In the accompanying drawing wherein I have illustrated a preferred embodiment of my invention.

Figure 1 is a fragmentary plan view of my device.

Figure 2 is an edge view thereof, and,

Figure 3 is a fragmentary perspective view thereof.

My device comprises a graduated beam 1 which terminates at one end in a right-angled extension 1'. Beam 1 is graduated in any desired units of distance measurement, such as feet, yards, miles, etc.

Slidable longitudinally along beam 1 is a carrier 2 for the channeled holder 3 of an adjustable mirror 4. Mirror 4 is disposed in an upright position on the upper face of beam 1 at an oblique angle to the longitudinal axis of said beam. This may be a fixed position, although in some instances, and as shown in this drawing, it is preferable that the mirror and its holder shall be capable of angular adjustment about its vertical axis.

Such adjustment may be accomplished in any of several ways. Conveniently, the circular base 3' of the mirror holder may be provided adjacent its periphery with several spaced arcuate slots 10 in which are arranged headed screws 9, or their equivalents, threaded into the upper face of the carrier 2 (see Figure 2).

By unloosening these screws, the mirror and its holder may be turned or adjusted angularly with respect to the beam and locked in a new position. The amount of angular adjustment may be visually indicated by means of graduations $a$, $b$, and $c$, on the base and carrier, respectively, which are readable with reference to each other. These graduations may represent any desired units of measurements. Accidental movement of mirrors 4 along beam 1 may be prevented in any suitable manner, as by means of the bowed spring 12 fastened as at 11 to carrier 2 and frictioning against beam 1.

Fixedly mounted as at 8 on beam 1 adjacent the outer corner thereof where extension 1' joins said beam is a stationary mirror holder 5 containing a mirror 6. Mirror 6 is disposed in an upright position on the upper face of beam 1 at an angle of 45° to the longitudinal axis of said beam. It is preferably of about one-half the height of mirror 4.

Where mirror 6 is mounted in a channeled holder of the type shown in this drawing, the space between the upper edge of the mirror and the lower edge of the top cross-piece of the holder constitutes a sight opening 5' (see Figure 3) through which the target may be viewed. Conveniently, the vertical center line of the mirror 6 may be marked, as at 6'.

Fixedly mounted at the extreme outer end of beam extension 1' is a vertically disposed eye piece 7 containing a sight opening 7' so located therein as to permit the target T to be viewed at a point just above the top center of fixed mirror 6.

Eye-piece 7 may be held in fixed position on the beam-extension 1' by any suitable method. As here shown, it has a screw-threaded stud 7a extending through the beam extension, and a washer 13 and lock nut 14 are provided for preventing unwanted movement of the eye-piece relative to the beam-extension.

In Figure 1, the line of sight through sight opening 7' to target T is indicated by the line marked "L. S."; the line of incidence of the image of the target on mirror 4 by the line marked "From object"; and the line of reflection of the image of the target as reflected by mirror 4 onto mirror 6 by the line marked "L. R."

It will be noted that these several lines define a right-angled triangle, and hence in using my device, the operator will proceed as follows:

He first adjusts movable mirror 4 along beam 1 until the inner edge of its holder 3 coincides with the graduation $x$ of beam 1 which is nearest to the stationary mirror 6. Where the mirror 4 is angularly adjustable, the mirror may be first rotated and then locked at whichever unit of distance measurement is to be employed, as feet, yards, miles, etc.

The target is now viewed through the sight opening of eye-piece 7, the adjustable mirror being immediately adjusted longitudinally along beam 1 until the line of incidence from the target to the adjustable mirror equals the line of reflection from said adjustable mirror to said fixed mirror. By consulting the graduations on beam 1 at which mirror 4 is now positioned, the number of feet, yards, or miles, that the target is distant from the sight-opening is established in terms of whatever unit of measurement is being used. This is because according to the principle of similar triangles on which my device operates, if one side of such a triangle is changed, but the angles are not changed, each other side is changed proportionately.

Because of its extreme simplicity of construction and operation, my instrument is especially useful as a range-finder in military or naval operations. Its operation requires no particular training or skill and consequently it can be placed in the hands of ordinary troops in the field with complete assurance. Inasmuch as the accuracy of its readings do not depend upon elaborate calculations or the careful manipulation of many different moving parts, my instrument enables the range to be quickly found. This is of especial advantage where the prevailing weather conditions may be adverse. Moreover, due to the geometrical principle upon which the operation of my instrument is based, the reading obtained at any time is necessarily a correct reading.

Although its use by the armed services is important, my instrument obviously has many peace-time uses, as by game-hunters, yachtsmen, surveyors, and the like.

While I have described a preferred embodiment of my invention, I recognize that the design and structure of my instrument are susceptible of various changes. For example, for many uses to which my instrument may be put, it may not be necessary to adjust the angularity of the movable mirror and consequently, such adjustment feature may be omitted wherever desired. Similarly, I may not always construct the holder 5 for the fixed mirror 6 so as to define a viewing opening 5' above the top edge of that mirror. Likewise, the design of the carrier 2 for the slidable mirror 4 may be other than that shown. Accordingly, these, and all such modifications, are to be regarded as within the spirit and scope of my invention if within the limits of the appended claims.

I claim:

1. In combination, a relatively thin, light-weight metal try-square having a graduated longer beam arm and a shorter integral arm at right angles thereto, a detachable slide adjustably positionable on the beam, a reflecting surface carried by said slide and adjustably disposable at angles to the line of movement of said slide throughout its length receptive of rays from a target object, a detachable reflector mounted at the axial juncture of the beam and arm members of the try-square having a vertical surface of reflection less than the height of the slide reflector, and a non-reflective observation surface above its reflection surface and disposed at an angle receptive of rays from the reflector on said slide having a supplementing observation opening, a detachable eye peep sight mounted on the arm member in the line of sight above the reflective surface for observation of the target object direct and in comparative image as transmitted by the reflector slide when positioned on the beam arm at spacing receptive of the target reflected ray of observation.

2. The combination of claim 1, in which the thin try-square is of light sheet metal of uniform thickness and capable of use as a carpenter's or like try-square when stripped of its attachments.

HENRY G. WHITMORE.